June 25, 1963
L. E. WALTON ETAL
3,094,804
FISHING LURE
Filed March 30, 1961
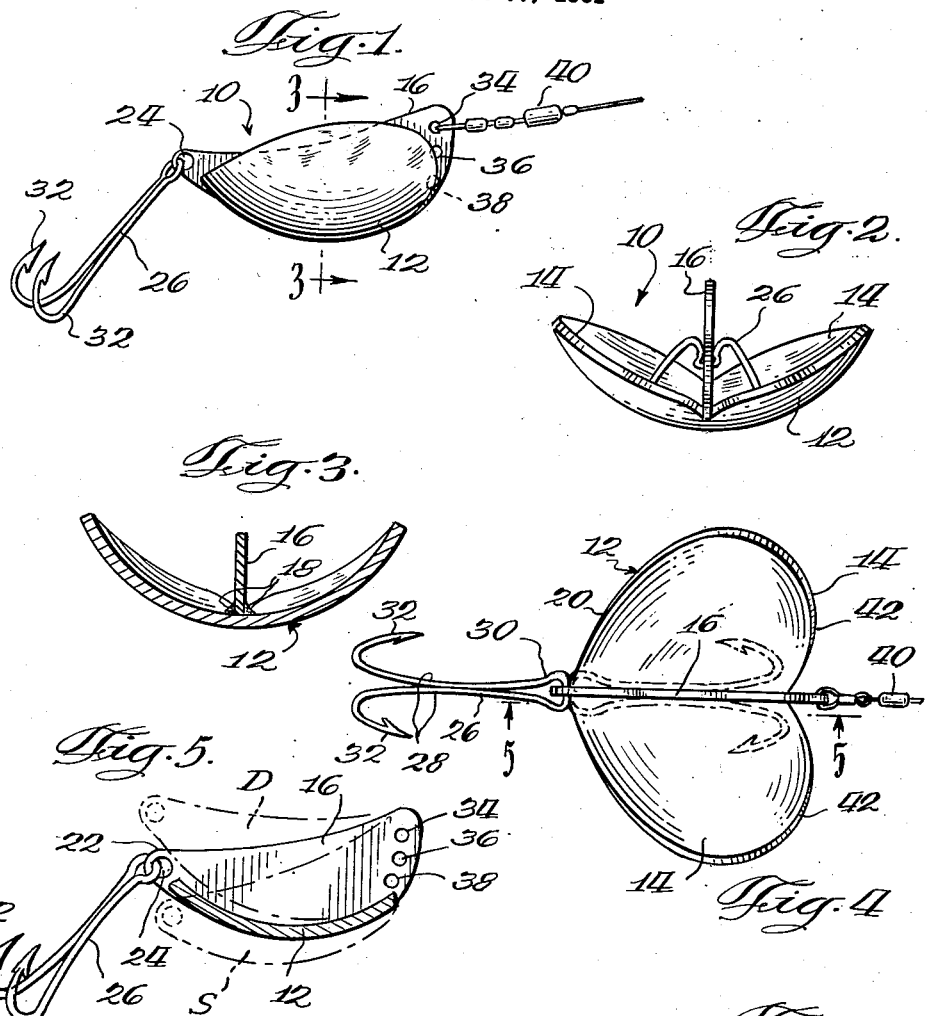
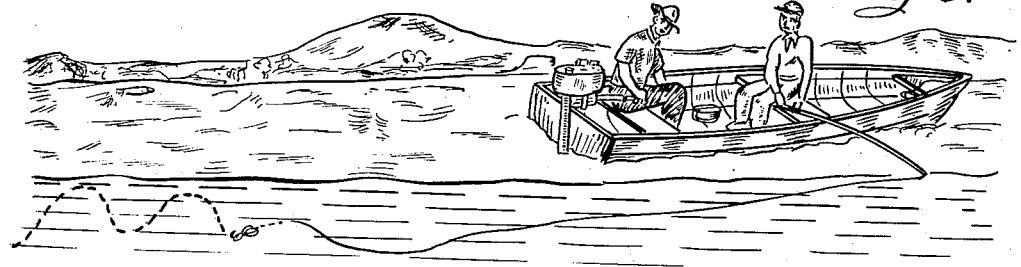
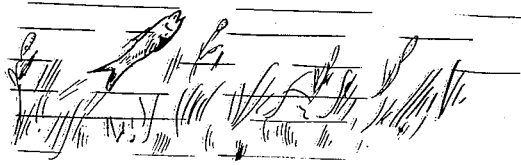
INVENTORS.
Lyman E. Walton
Tom Jones
By Silverman, Mullin & Cass
Attorneys United States Patent Office 3,094,804
Patented June 25, 1963

3,094,804
FISHING LURE
Lyman E. Walton and Tom Jones, Chicago, Ill., assignors to Carroll-Walton Engineering Co., Inc., Chicago, Ill., a corporation of Illinois
Filed Mar. 30, 1961, Ser. No. 99,435
2 Claims. (Cl. 43—42.23)

This invention relates generally to fishing lures, and more particularly, is concerned with a relatively simple fishing lure which has an unusual undulating or serpentine movement as the lure is pulled through water.

Artificial lures for fishing have been made in a multitude of constructions by fishermen ever since the advent of fishing and when fishing became a sport instead of a means for procuring food, the art of making lures was accelerated.

Artificial lures have taken many forms, depending upon the belief and theory of the maker. With the advent of improved fishing apparatus, varieties of lures increased exponentially, so that today it is almost impossible to catalog the number and variety of fishing lures commercially available, let alone the variations privately built by hopeful fishermen.

There are two basic theories upon which the construction of artificial lures is based, each of which has its unyielding advocates. The fisherman today usually fills his tackle box with a variety of both, and a great deal of his time is spent in changing lures to see if he can find one which will strike the fancy of a fish on that particular day under those particular conditions. One theory of artificial lure construction is to make the lure resemble a natural object, either through appearance, movement, and sometimes even through sound and odor. Lures of this kind simulate the appearance, action and other characteristics of fish, insects, mice and animals in different states of health. There are injured minnows, fluttering moths, swimming muskrats, struggling mice and the like.

The second theory upon the basis of which lures are built, and the theory upon which the present invention is based, is that, given sufficient movement, any object regardless of its appearance will attract fish and cause them to strike.

There are many lures which are on the market today which combine the two theories, but it is universally agreed among manufacturers of artificial bait and lures, and acquiesced in by the victims, that the artificial lures available on the market today catch more fishermen than fish.

Obviously, the most important object of the invention is to provide a construction for an artificial lure which will be quite effective in attracting fish, but more practically, the object of the invention is to provide an artificial lure suitable for use in virtually any type of fishing under any conditions and for a great variety of fish.

An important object of the invention is to provide a substantially universal type of fishing lure which can be made in many different sizes and shapes without the need for complicated tools, dies, molds and machinery that will result in a highly effective lure. Almost any artificial lure purchased today will have careful instruction in the use of the lure, the religious observation of which is practically guaranteed to result in rashes of piscatorial suicide. Whether effective or not, the average fisherman is usually unable to execute the techniques with the ease described in the instructions.

The invention herein has an important object the provision of an artificial lure in which the movement of the lure as it is merely pulled through the water without complex manipulation is an undulating or sinuous movement restricted to a vertical plane, such a movement having been found through experimentation to be attractive to fish.

A further object of the invention is to provide a simple and highly effective artificial lure, the movement through the water of which is an undulating movement in a vertical plane as set forth above, and in which the frequency of undulation is a simple function of the speed at which the lure is pulled through the water, and in which even the slightest movement will result in at least some undulation.

Still a further object of the invention is the provision of a lure of the character described in which the attitude at which the lure is pulled through the water is readily changed by the user in choosing one of the plurality of perforations to which the line is attached.

Still a further and quite important object of the invention is to provide a lure of the character described in which a trailing hook is provided at the end of the lure, and the lure is so constructed that the hook may be rotated onto the face of the lure and will remain in this position with its barbs held inwardly of the edges of the lure so that the lure may be handled safely and even placed in one's pocket without danger of having the hooks engage clothing.

Many objects of the invention will occur as a description of the preferred embodiment thereof is set forth hereinafter and as shown in detail in the attached drawing, but it is desired to point out that a lure constructed in accordance with the invention may take many different forms without in any way departing from the spirit or scope of the invention.

In the drawing:

FIG. 1 is a side elevational view of an artificial fishing lure constructed in accordance with the invention, the same being shown in one attitude during use.

FIG. 2 is a front-on elevational view of the fishing lure of FIG. 1 but showing the hooks folded onto the vertical fin of the lure and being held thus in safety position.

FIG. 3 is a sectional view taken through the lure along the line 3—3 of FIG. 1 and in the direction indicated.

FIG. 4 is a top plan view of the lure showing the same as it is pulled through the water and showing in broken lines the safety position for the hooks.

FIG. 5 is a sectional view through the lure taken generally along the line 5—5 of FIG. 4 and in the indicated direction, the said view also showing two other attitudes of the lure as it is pulled through the water.

FIG. 6 is a diagrammatic view showing generally the movement of the lure through the water as it is pulled by the fisherman.

Generally, the lure of the invention is formed as a base plate having the configuration of a portion of a surface of a hollow sphere, symmetrical on opposite sides of its front to rear axis; a vertical fin secured to the concave surface of the base plate and defining the center thereof; a ganged hook assembly secured to the rear of the fin; and a plurality of perforations along the forward edge of the fin in a generally vertical series adapted to have the fishing line secured thereto. In use, the fishing line is secured to one of the perforations and the lure is pulled through the water by any one of the well known methods used for fishing today, including trolling, casting and spinning.

Considering now the details of the invention, in FIG. 1 there is illustrated a fishing lure 10 which is constructed in accordance with the invention. The base plate 12 is in the form of an oval dish, the top plan view of which is generally seen in FIG. 4, thereby providing wings 14 on opposite sides of the front to rear axis of the lure. In FIG. 4, the axis of the lure is horizontal.

As mentioned above, it is believed essential to the operation of the device that the configuration of the base plate 12 be substantially that of a portion of the surface of a sphere. Obviously, slight departures from spherical will provide the desired movement, but for manufacturing ease, it has been found that a spherical configuration gives excellent results with economical fabrication.

A vertical fin 16 of generally oval shape is secured to the center of the base plate 12, preferably by soldering or welding, as indicated at 18. It is preferable that the stock from which the vertical fin 16 is made be of light weight, such as, for example, thinner gauge metal than that from which the base 12 is formed, since the function of the fin is to provide stability and prevent lateral movement of the lure 10. The center of gravity of the lure 10 should be as low as possible, and hence, the soldered or welded joints 18 may be formed generously and/or the material from which the base plate 12 is made may be substantially heavier than that from which the vertical fin 16 is made.

The rear or trailing end of the vertical fin 16 preferably extends beyond the trailing edge 20 of the wings 14, as indicated at 22, so that an eye 24 formed therein is completely rearward of said trailing edges 20. A ganged hook assembly is pivotally mounted in the eye 24, and because of the location of the eye, the said hook assembly is capable of free swivel movement as the lure is pulled through the water. It is preferred that the particular assembly 26 be a double hook, as shown, of bifurcated configuration, thereby forming the two halves with the shanks 28 parallel. No other securement of the halves is provided, the bight 30 of the hook assembly providing resilient bias tending to keep the shanks 28 close together. The hook assembly 26 is attached with the bight 30 in the eye 24 with the barb portions 32 of the hook assembly 26 facing upward.

At its forward end, the fin 16 has three perforations at 34, 36 and 38. As shown in FIG. 1 and in FIG. 4, a fishing line with its usual snaps, swivels and the like as indicated generally at 40 may be secured in any one of the perforations 34, 36 or 38. The location of the line will determine the attitude of the lure as it is pulled through the water. Assuming that the attitude will be approximately as shown in FIGS. 1 and 5 when the lure is secured to the line at the perforation 36, attaching the line 40 to the upper perforation 34 will tilt the entire lure downwardly as indicated by the broken line marked D in FIG. 5; securing the line to the perforation 38 will result in raising the front end of the lure and forcing the lure to take the attitude indicated by the broken line S in FIG. 5. As may be surmised, D signifies "deep" and S signifies "shallow." The reasons for this will become apparent in the description of the movement of the lure as set forth below.

Before discussing the movement of the lure, an important safety feature thereof will be described. When the lure is not in use, the hook assembly 26 may be rotated about the eye 24 in a clockwise direction as viewed in FIGS. 1 and 5 until the fin 16 enters the space between the two shanks 28, forcing them apart. The inherent resilience of the bight 30 thereby will cause frictional engagement of the hook assembly 26 upon the fin in the position shown by the broken lines in FIG. 4 and as shown as well in FIG. 2. Since the hooks with their barbs are spaced inwardly of the edges of the wings 14 and held in this position with the hooks virtually lying against the inner concave surface of the wings, the lure readily may be handled and even placed in one's pocket without danger. For use, the hook assembly is simply swung up until it hangs loosely as shown in FIGS. 1 and 5.

In FIG. 6, there is a diagrammatic representation showing in a broken line the movement of the lure as it is pulled through the water. This, it will be seen, is an undulating or sinuous up and down movement with practically no lateral wobbling whatsoever. It is believed that this movement is caused by an alternate scooping and release of water by the base plate 12 of the lure. Thus, for example, as the lure is pulled forward, that is to the right as viewed in FIGS. 1, 4 and 5, as the water engages the leading edges 42 of the wings 14, the lure tends to rise in the water, that is rotating in a counter clockwise direction, but soon the bottom surface of the lure engages more of the oncoming water than the top, and this forces the lure suddenly to dip at which time it commences scooping water, and the cycle begins all over again. Obviously, the deeper the initial attitude of the lure, that is the more the front end is pulled down by the line, the deeper the lure will tend to run.

The theories of operation as set forth above may or may not be correct, but irrespective of this, it has been found that the lure does undulate or move in a sinuous movement during the pulling thereof through the water, and it has also been found that this movement has been effective in catching fish.

The configuration of the wings 14 and the fin 16 is subject to great variation. Many attractive configurations can be worked out, and indeed, one bird or bat-like structure has been used with marked success.

The lure can be made from a variety of materials with a variety of finishes and may be fabricated of one molded piece instead of two pieces soldered or welded together. Metal is preferred because of weight and ease of finishing. Many other forms will occur to those skilled in this art, but it is desired that there be no limitation upon the scope or coverage of the invention except as set forth in the appended claims.

What it is desired to secure by Letters Patent of the United States is:

1. A fish lure that will travel through the water with an undulating or sinuous up and down movement with substantially no lateral movement when attached to a fish line and having associated therewith a hook, the lure comprising a concavo-convex base member generally heart-shaped in outline and an outwardly extending stabilizing fin member on the concave surface at the longitudinal axis of the base dividing the base member into lateral wing portions each of substantially the same dimensions and each being of concavo-convex configuration and having leading and trailing edges, the forward edges of the base each being similarly curved inwardly and converging at the longitudinal central axis of the body, the trailing edge of the base being curved and converging at the longitudinal axis and which is in axial alignment with the leading edge portion, the stabilizing fin being of a greater length than the said longitudinal central portion of the base and having an arcuate curved forward end portion thereof projecting slightly beyond the leading edge of the base and with its rear edge portion thereof projecting slightly beyond the trailing edge of the base at the said longitudinal axis of the base, the stabilizing fin being of a cross-sectional thickness not greater than the cross-sectional thickness of the said base, the height of the stabilizing fin adjacent the arcuate curved forward end portion being not less than half the width of each wing portion measured laterally from the juncture of said fin and the outermost edge of said wing member and diminishing toward the rear edge thereof, line attaching means provided adjacent the arcuate leading edge of said stabilizing fin and hook attaching means provided adjacent the rear edge portion of said fin.

2. The structure as defined in claim 1 wherein means for selectively securing said fishing line at any one of a plurality of level spaced above said concave surface are positioned adjacent said forward end of said stabilizing fin.

References Cited in the file of this patent

UNITED STATES PATENTS

| | | |
|---|---|---|
| D. 189,008 | Foster | Oct. 11, 1960 |
| 681,308 | Geen | Aug. 27, 1901 |
| 861,116 | Heddon | July 23, 1907 |
| 1,197,820 | Guise | Sept. 12, 1916 |
| 1,306,719 | Robertson | June 17, 1919 |
| 1,464,041 | Holcomb | Aug. 7, 1923 |
| 1,608,375 | Dewey | Nov. 23, 1926 |
| 1,832,768 | Davenport | Nov. 17, 1931 |
| 1,910,742 | Binns | May 23, 1933 |
| 2,597,035 | Rickard | May 20, 1952 |
| 3,002,311 | Kyper | Oct. 3, 1961 |